(12) United States Patent
Griffin et al.

(10) Patent No.: US 12,039,404 B2
(45) Date of Patent: Jul. 16, 2024

(54) PERFORMING DYNAMIC PROGRAMMATIC ENTANGLEMENT IN QUANTUM PROCESSING DEVICES

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 394 days.

(21) Appl. No.: 17/387,117

(22) Filed: Jul. 28, 2021

(65) Prior Publication Data

US 2023/0034075 A1     Feb. 2, 2023

(51) Int. Cl.
    *G06N 10/00*              (2022.01)

(52) U.S. Cl.
     CPC .................................... *G06N 10/00* (2019.01)

(58) Field of Classification Search
     USPC ......................................................... 716/100
     See application file for complete search history.

(56) References Cited

U.S. PATENT DOCUMENTS

| | | | |
|---|---|---|---|
| 9,858,531 B1 | 1/2018 | Monroe et al. | |
| 2018/0260245 A1 | 9/2018 | Smith | |
| 2020/0074346 A1 | 3/2020 | Griffin et al. | |
| 2020/0366316 A1* | 11/2020 | Griffin ................ | G06F 16/1744 |
| 2022/0172095 A1* | 6/2022 | Li .......................... | G06N 10/40 |

OTHER PUBLICATIONS

Author Unknown, "Tutorial: Explore entanglement with Q#," Microsoft, Feb. 1, 2021, https://docs.microsoft.com/en-us/azure/quantum/tutorial-qdk-explore-entanglement, 13 pages.
Khammassi, N. et al., "cQASM v1.0—Towards a Common Quantum Assembly Language," May 24, 2018, https://arxiv.org/abs/1805.09607, 12 pages.
Schlosshauer, M., "The Quantum-to-Classical Transition and Decoherence," arXiv: 1404.2635v2 [quant-ph], Nov. 20, 2019, https://arxiv.org/pdf/1404.2635.pdf, 22 pages.
Zhang, Y. et al., "Optimizing Quantum Programs against Decoherence-Delaying Qubits into Quantum Superposition," arXiv:1904.09041v2 [quant-ph], Jul. 27, 2019, https://arxiv.org/pdf/1904.09041.pdf, 8 pages.

\* cited by examiner

*Primary Examiner* — Bryce M Aisaka
(74) *Attorney, Agent, or Firm* — Dority & Manning, P.A (57) ABSTRACT

Performing dynamic programmatic entanglement in quantum computing devices is disclosed herein. In one example, a quantum computing device executes a quantum service that comprises a first qubit and a second qubit. The quantum computing device implements an entanglement service that subsequently determines that the first qubit and the second qubit are to be placed in an entangled state. In response to the determining, the entanglement service places the first qubit and the second qubit in an entangled state, without requiring the quantum service to be terminated and restarted. In this manner, operations for programmatically entangling the qubits can be performed dynamically, and can be decoupled from the life cycle of the quantum service.

20 Claims, 6 Drawing Sheets

PERFORMING DYNAMIC PROGRAMMATIC ENTANGLEMENT IN QUANTUM PROCESSING DEVICES

BACKGROUND

Quantum computing involves the use of quantum bits, referred to herein as "qubits," which have characteristics that differ from those of classical (i.e., non-quantum) bits used in classical computing. For example, a pair of qubits may experience a physical phenomenon referred to as "entanglement," in which the quantum state of each qubit cannot be described independently of the state of the other qubit. Qubits may be employed by quantum services that are executed by quantum computing devices. As quantum computing continues to increase in popularity and become more commonplace, an ability to place or restore qubits into an entangled state without requiring a corresponding quantum service to be restarted will be desirable.

SUMMARY

The examples disclosed herein implement an entanglement service for performing dynamic programmatic entanglement in quantum computing devices. In some examples, a quantum computing device executes a quantum service that comprises a first qubit and a second qubit. The entanglement service subsequently determines that the first qubit and the second qubit are to be placed in an entangled state (e.g., in response to a request from the quantum service, or upon detecting decoherence of a previously existing entangled state between the first qubit and the second qubit, as non-limiting examples). In response to the determining, the entanglement service places the first qubit and the second qubit in an entangled state, without requiring the quantum service to be terminated and restarted. In this manner, operations for programmatically entangling the qubits can be performed dynamically and can be decoupled from the life cycle of the quantum service.

In one example, a method for performing dynamic programmatic entanglement in quantum computing devices is disclosed. The method comprises executing, by a quantum computing device, a first quantum service comprising a first qubit and a second qubit. The method further comprises, subsequent to executing the first quantum service, determining, by an entanglement service of the quantum computing device, that the first qubit and the second qubit are to be placed in an entangled state. The method also comprises, responsive to the determining, placing, by the entanglement service, the first qubit and the second qubit in an entangled state.

In another example, a quantum computing device for performing dynamic programmatic entanglement is disclosed. The quantum computing device comprises a system memory, and a processor device communicatively coupled to the system memory. The processor device is to execute a first quantum service comprising a first qubit and a second qubit. The processor device is further to, subsequent to executing the first quantum service, determine, using an entanglement service, that the first qubit and the second qubit are to be placed in an entangled state. The processor device is also to, responsive to the determining, place the first qubit and the second qubit in an entangled state using the entanglement service.

In another example, a non-transitory computer-readable medium is disclosed. The non-transitory computer-readable medium stores thereon computer-executable instructions that, when executed, cause one or more processor devices to execute a first quantum service comprising a first qubit and a second qubit. The computer-executable instructions further cause the one or more processor devices to, subsequent to executing the first quantum service, determine that the first qubit and the second qubit are to be placed in an entangled state. The computer-executable instructions also cause the one or more processor devices to, responsive to the determining, place the first qubit and the second qubit in an entangled state.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first quantum service" and "second quantum service," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As discussed above, quantum computing involves the use of quantum bits, referred to herein as "qubits," which have characteristics that differ from those of classical (i.e., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit cannot be described independently of the state of the other qubit. Classical computing has no corollaries to superposition and entanglement. The phenomenon of entanglement in particular is useful for purposes such as "superdense encoding," which allows two classical bits of information to be transmitted from a sender to a recipient by sending only one qubit from the sender to the recipient.

Qubits can be programmatically entangled (i.e., entangled via execution of a series of instructions) using a Quantum Assembly Language (QASM) file that defines a quantum service that uses the qubits. However, a state of entanglement between two qubits can be easily disrupted or "decohered," either intentionally when reading a result of a quantum calculation or unintentionally by inadvertently accessing an entangled qubit. Reestablishing the state of entanglement may require stopping the executing quantum service, deallocating its resources, and instantiating a new instance of the quantum service. This dependence between the lifecycle of the quantum service and the ability to establish a state of entanglement limits the potential functionality of the quantum service. Thus, as quantum computing continues to increase in popularity and become more commonplace, an ability to place or restore qubits into an entangled state without requiring a corresponding quantum service to be restarted will be desirable.

In this regard, the examples disclosed herein implement an entanglement service for performing dynamic programmatic entanglement in quantum computing devices. As used herein, the term "quantum service" and derivatives thereof refer to a process that executes on a quantum computing device, and that accesses one or more qubits to provide a desired functionality. In exemplary operation, a processor device of a quantum computing device executes a first quantum service that comprises a first qubit and a second qubit, and also executes an entanglement service. While the first quantum service is executing, the entanglement service determines that the first qubit and the second qubit are to be placed in an entangled state. For example, the entanglement service may receive a request from the quantum service to place the first qubit and the second qubit in an entangled state, and/or the entanglement service may detect decoherence of a previously existing entangled state between the first qubit and the second qubit (based on, e.g., a change in one or more of a rate of readout errors, a rate of gate errors, longitudinal relaxation (T1) times, and/or transverse (T2) relaxation times for the first qubit and the second qubit). In response to the determining, the entanglement service then places the first qubit and the second qubit in an entangled state, without requiring the quantum service to be terminated and restarted. This may be accomplished in some examples by applying a Hadamard gate to the first qubit, and further applying a Controlled NOT (CNOT) gate to the second qubit. In this manner, operations for programmatically entangling the qubits can be performed dynamically, and can be decoupled from the life cycle of the quantum service.

In some examples, the entanglement service may also provide notification of a change in the entangled state of the first qubit and the second qubit to the first quantum service or another service. Thus, in such examples, the entanglement service may receive a request for notification of a change in the entangled state for the first qubit and the second qubit from a second service. Upon programmatically entangling the qubits as described above, the entanglement service in such examples may notify the second service that the first qubit and the second qubit are in an entangled state. Similarly, if the first qubit and the second qubit are in an entangled state and the entanglement service subsequently detects decoherence of the entangled state between the first qubit and the second qubit, the entanglement service in such examples may notify the second service that the first qubit and the second qubit are not in an entangled state.

Figure 1:
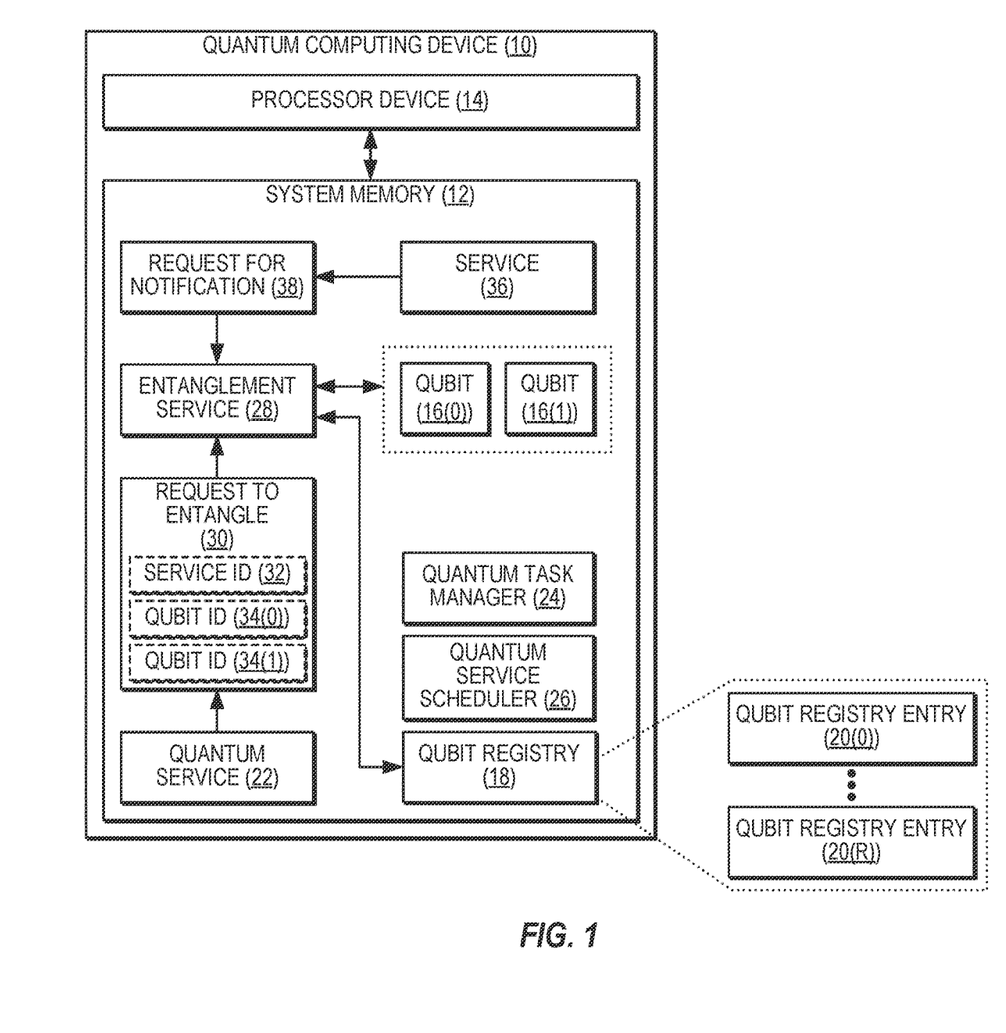
FIG. 1 is a block diagram of a quantum computing device in which examples may be practiced.

FIG. 1 is a block diagram of a quantum computing device 10 that comprises a system memory 12 and a processor device 14. The quantum computing device 10 in some examples may be communicatively coupled to one or more other quantum computing devices (not shown) and/or one or more other classical computing devices (not shown) via a classical communications link (not shown), which may comprise a private network or a public network such as the internet. In addition, the quantum computing device 10 may be coupled to one or more other quantum computing devices (not shown) via a quantum channel (not shown), which may comprise any communications channel over which qubits may be sent (such as, e.g., fiber optic cabling or pulsed lasers, as non-limiting examples). It is to be understood that the quantum computing device 10 of FIG. 1 may include constituent elements in addition to those illustrated in FIG. 1.

The quantum computing device 10 in the example of FIG. 1 operates in quantum environments, but is capable of operating using classical computing principles or quantum computing principles. When using quantum computing principles, the quantum computing device 10 performs computations that utilize quantum-mechanical phenomena, such as superposition and/or entanglement states. The quantum computing device 10 may operate under certain environmental conditions, such as at or near zero degrees (0°) Kelvin. When using classical computing principles, the quantum computing device 10 utilizes binary digits that have a value of either zero (0) or one (1).

In the example of FIG. 1, the quantum computing device 10 implements a set of one or more qubits, including a first qubit 16(0) and a second qubit 16(1), for use by quantum services executed by the quantum computing device 10. It is to be understood that, while FIG. 1 illustrates only the first qubit 16(0) and the second qubit 16(1), examples disclosed herein may implement more qubits than shown in FIG. 1. To maintain information for qubits implemented by the quantum computing device 10, the quantum computing device 10 includes a qubit registry 18, which comprises a plurality of qubit registry entries 20(0)-20(R) each corresponding to a qubit such as the first qubit 16(0) and the second qubit 16(1). The qubit registry 18 maintains and provides access to data relating to the qubits implemented by the quantum computing device 10, such as a count of the total number of qubits implemented by the quantum computing device 10 and a count of the number of available qubits that are currently available for allocation, as non-limiting examples. Each of the qubit registry entries 20(0)-20(R) of the qubit registry 18 also stores qubit metadata for a corresponding qubit. The qubit metadata may include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state.

The quantum computing device 10 of FIG. 1 executes one or more quantum services, such as a quantum service 22. The quantum service 22 is a process that employ qubits such as the first qubit 16(0) and the second qubit 16(1) to provide desired functionality. Execution of quantum services such as the quantum service 22 is facilitated by a quantum task manager 24 and a quantum service scheduler 26. The quantum task manager 24 of the quantum computing device 10 handles operations for creating, monitoring, and terminating quantum services, while the quantum service scheduler 26 of the quantum computing device 10 controls the scheduling of quantum services for execution by the processor device 14 and the allocation of processing resources to executing quantum services. The functionality of the quantum task manager 24 and the quantum service scheduler 26 may be made accessible to other services and processes (e.g., via a defined application programming interface (API), as a non-limiting example).

The first qubit 16(0) and the second qubit 16(1) can be programmatically entangled (i.e., entangled via execution of a series of instructions) using a QASM file that defines a quantum service that uses the qubits. However, a state of entanglement established between the first qubit 16(0) and the second qubit 16(1) can be easily disrupted or "decohered." Decoherence may result either intentionally when reading a result of a quantum calculation, or unintentionally by inadvertently accessing an entangled qubit. Reestablishing the state of entanglement between the first qubit 16(0) and the second qubit 16(1) may require stopping the quantum service 22, deallocating its resources, and instantiating a new instance of the quantum service 22. As noted above, this dependence between the lifecycle of the quantum service 22 and the ability to establish a state of entanglement limits the potential functionality of the quantum service 22. Accordingly, an ability to place or restore qubits such as the first qubit 16(0) and the second qubit 16(1) into an entangled state without requiring the corresponding quantum service 22 to be restarted will be desirable.

In this regard, the examples disclosed herein implement an entanglement service 28 for performing dynamic programmatic entanglement. In exemplary operation, the entanglement service 28 determines, while the quantum service 22 is executing, that the first qubit 16(0) and the second qubit 16(1) are to be placed in an entangled state. In some examples, the entanglement service 28 may make this determination in response to receiving a request 30 to entangle from the quantum service 22 to place the first qubit 16(0) and the second qubit 16(1) in an entangled state. Such examples may provide that the request 30 includes a quantum service identifier (captioned as "SERVICE ID" in FIG. 1) 32 that identifies the quantum service 22, a first qubit identifier (captioned as "QUBIT ID" in FIG. 1) 34(0) that identifies the first qubit 16(0), and a second qubit identifier (captioned as "QUBIT ID" in FIG. 1) 34(1) that identifies the second qubit 16(1). The entanglement service 28 may then employ the quantum service identifier 32, the first qubit identifier 34(0), and the second qubit identifier 34(1), in conjunction with the qubit registry 18, to identify and access the specific qubits to entangle.

Some examples may provide that the entanglement service 28 may determine that the first qubit 16(0) and the second qubit 16(1) are to be placed in an entangled state by detecting decoherence of a previously existing entangled state between the first qubit 16(0) and the second qubit 16(1). In such examples, the entanglement service 28 may detect decoherence based on detecting a change in one or more of a rate of readout errors, a rate of gate errors, longitudinal relaxation (T1) times, and/or transverse (T2) relaxation times for the first qubit 16(0) and the second qubit 16(1).

In response to the determining, the entanglement service 28 places the first qubit 16(0) and the second qubit 16(1) in an entangled state, without requiring the quantum service 22 to be terminated and restarted. This may be accomplished in some examples by applying a Hadamard gate to the first qubit 16(0), and further applying a CNOT gate to the second qubit 16(1).

The entanglement service 28 according to some examples may further provide notification of a change in the entangled state of the first qubit 16(0) and the second qubit 16(1) to the quantum service 22 and/or to another service, such as a service 36. Thus, in the example of FIG. 1, the entanglement service 28 may receive a request 38 for notification of a change in the entangled state for the first qubit 16(0) and the second qubit 16(1) from the service 36. Upon programmatically entangling the first qubit 16(0) and the second qubit 16(1) as described above, the entanglement service 28 in such examples may notify the service 36 that the first qubit 16(0) and the second qubit 16(1) are in an entangled state. Similarly, if the first qubit 16(0) and the second qubit 16(1) are in an entangled state and the entanglement service 28 subsequently detects decoherence of the entangled state between the first qubit 16(0) and the second qubit 16(1) as described above, the entanglement service 28 in such examples may notify the service 36 that the first qubit 16(0) and the second qubit 16(1) are not in an entangled state.

It is to be understood that, because the entanglement service 28 is a component of the quantum computing device 10, functionality implemented by the entanglement service 28 may be attributed to the quantum computing device 10 generally. Moreover, in examples where the entanglement service 28 comprises software instructions that program the processor device 14 to carry out functionality discussed herein, functionality implemented by the entanglement service 28 may be attributed herein to the processor device 14. It is to be further understood that while, for purposes of illustration only, the entanglement service 28 is depicted as a single component, the functionality implemented by the entanglement service 28 may be implemented in any number of components, and the examples discussed herein are not limited to any particular number of components.

Figure 2A:
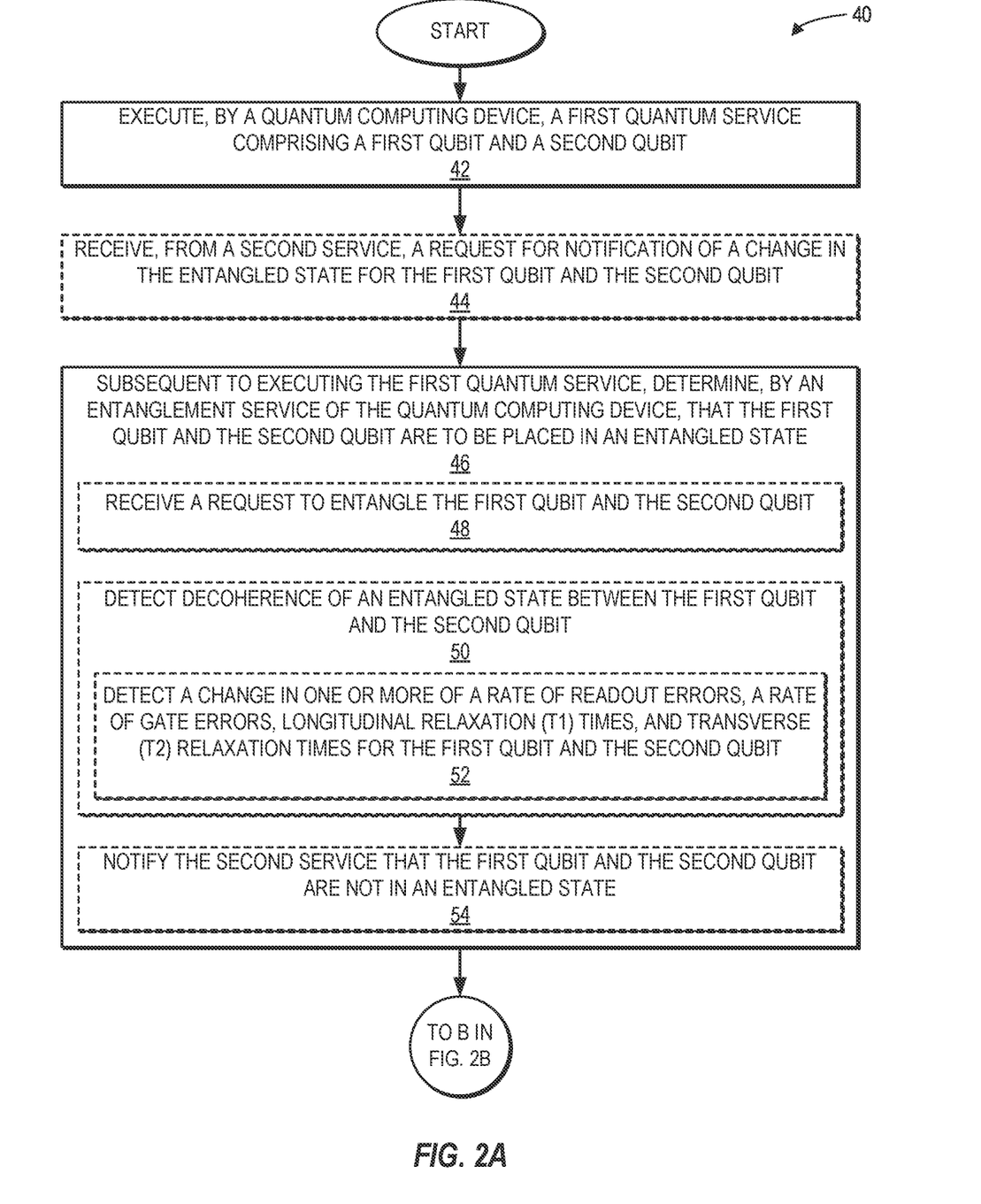
FIGS. 2A-2B are flowcharts illustrating operations performed by the quantum computing device of FIG. 1 for performing dynamic programmatic entanglement, according to one example.
Figure 2B:
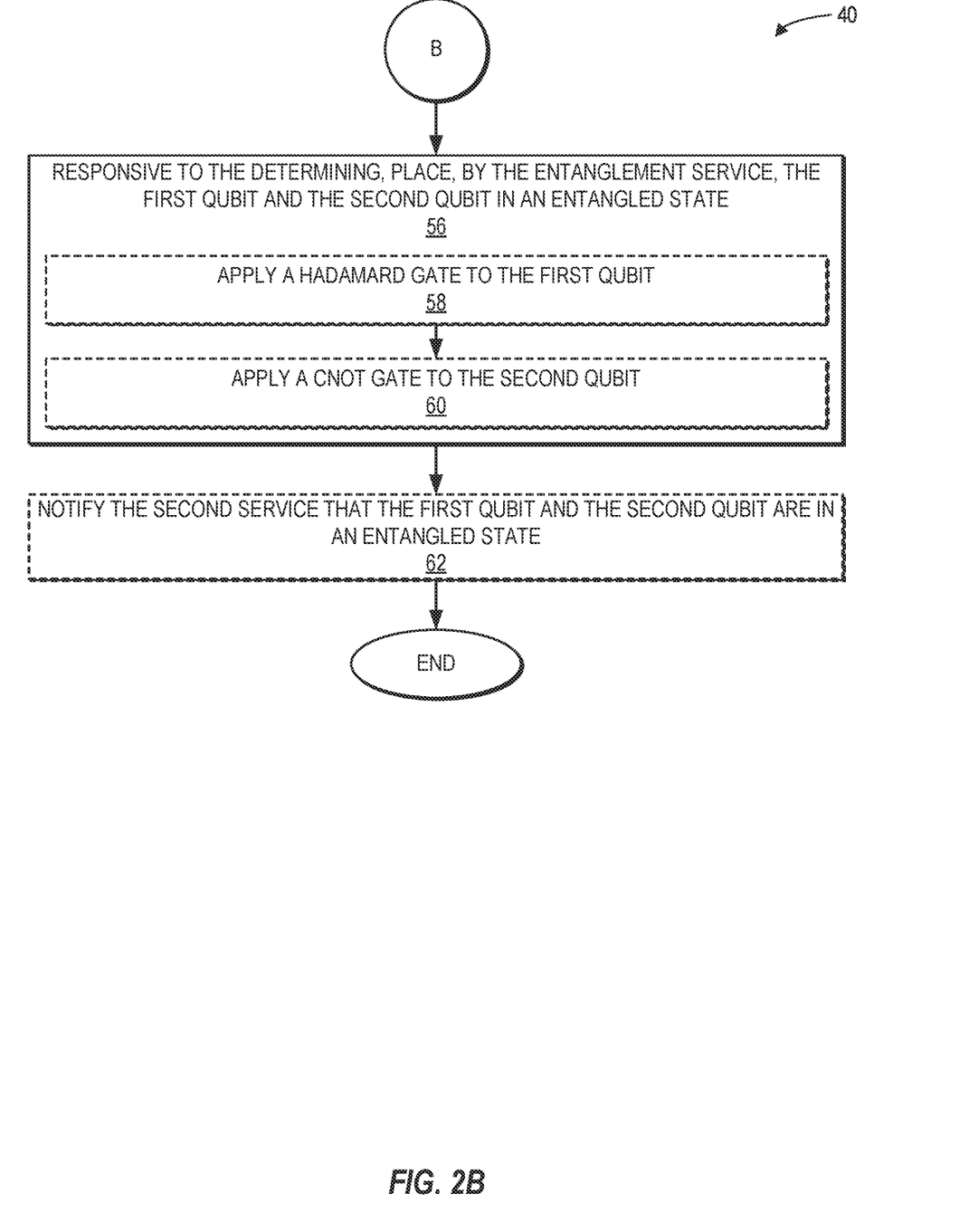

To illustrate exemplary operations performed by the quantum computing device 10 of FIG. 1 for performing dynamic programmatic entanglement according to one example, FIGS. 2A and 2B provide a flowchart 40. Elements of FIG. 1 are referenced in describing FIGS. 2A and 2B for the sake of clarity. In FIG. 2A, operations begin with a processor device of a quantum computing device (e.g., the processor device 14 of the quantum computing device 10 of FIG. 1) executing a first quantum service, such as the quantum service 22 comprising the first qubit 16(0) and the second qubit 16(1) (block 42). In some examples, an entanglement service executed by the processor device 14, such as the entanglement service 28 of FIG. 1, may receive, from a second service (e.g., the service 36 of FIG. 1), the request 38 for notification of a change in the entangled state for the first qubit 16(0) and the second qubit 16(1) (block 44).

Subsequent to executing the first quantum service 22, the processor device 14 (e.g., using the entanglement service 28) determines that the first qubit 16(0) and the second qubit 16(1) are to be placed in an entangled state (block 46). Some examples may provide that the operations of block 46 for determining that the first qubit 16(0) and the second qubit 16(1) are to be placed in an entangled state may comprise the entanglement service 28 receiving the request 30 to entangle the first qubit 16(0) and the second qubit 16(1) (block 48). In some examples, the operations of block 46 for determining that the first qubit 16(0) and the second qubit 16(1) are to be placed in an entangled state may comprise the entanglement service 28 detecting decoherence of an entangled state between the first qubit 16(0) and the second qubit 16(1) (block 50). In some such examples, detecting decoherence may be accomplished by detecting a change in one or more of a rate of readout errors, a rate of gate errors, longitudinal relaxation (T1) times, and transverse (T2) relaxation times for the first qubit 16(0) and the second qubit 16(1) (block 52). In examples according to block 44, in which the second service 36 sends the request 38 for notification of a change in the entangled state for the first qubit 16(0) and the second qubit 16(1), the entanglement service 28 may notify the second service 36 that the first qubit 16(0) and the second qubit 16(1) are not in an entangled state (block 54). Operations then continue at block 56 of FIG. 2B.

Referring now to FIG. 2B, in response to determining at block 46 that the first qubit 16(0) and the second qubit 16(1) are to be placed in an entangled state, the entanglement service 28 places the first qubit 16(0) and the second qubit 16(1) in an entangled state (block 56). According to some embodiments, the operations of block 56 for placing the first qubit 16(0) and the second qubit 16(1) in an entangled state may comprise the entanglement service 28 applying a Hadamard gate to the first qubit 16(0) (block 58). The entanglement service 28 may then apply a CNOT gate to the second qubit 16(1) (block 60). In examples according to block 44, in which the second service 36 sends the request 38 for notification of a change in the entangled state for the first qubit 16(0) and the second qubit 16(1), the entanglement service 28 may notify the second service 36 that the first qubit 16(0) and the second qubit 16(1) are in an entangled state (block 62).

Figure 3:
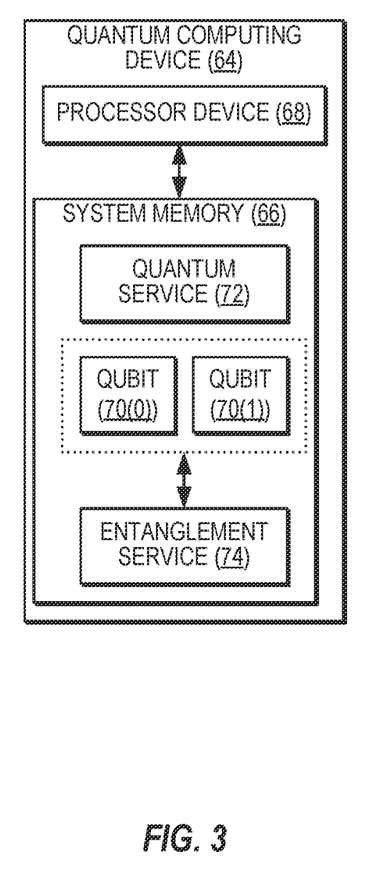
FIG. 3 is a simpler block diagram of the quantum computing device of FIG. 1 for performing dynamic programmatic entanglement, according to one example.

FIG. 3 is a simpler block diagram of the quantum computing device 10 of FIG. 1 for performing dynamic programmatic entanglement. In FIG. 3, a quantum computing device 64 comprises a system memory 66 and a processor device 68. The quantum computing device 64 implements a set of one or more qubits, including a first qubit 70(0) and a second qubit 70(1), for use by quantum services executed by the quantum computing device 64. The quantum computing device 64 of FIG. 3 executes a quantum service 72, which is a process that employs the first qubit 70(0) and the second qubit 70(1) to provide desired functionality. The quantum computing device 64 also implements an entanglement service 74 for performing dynamic programmatic entanglement. In exemplary operation, the entanglement service 74 determines, while the quantum service 72 is executing, that the first qubit 70(0) and the second qubit 70(1) are to be placed in an entangled state. In response to the determining, the entanglement service 74 places the first qubit 70(0) and the second qubit 70(1) in an entangled state, without requiring the quantum service 72 to be terminated and restarted.

Figure 4:
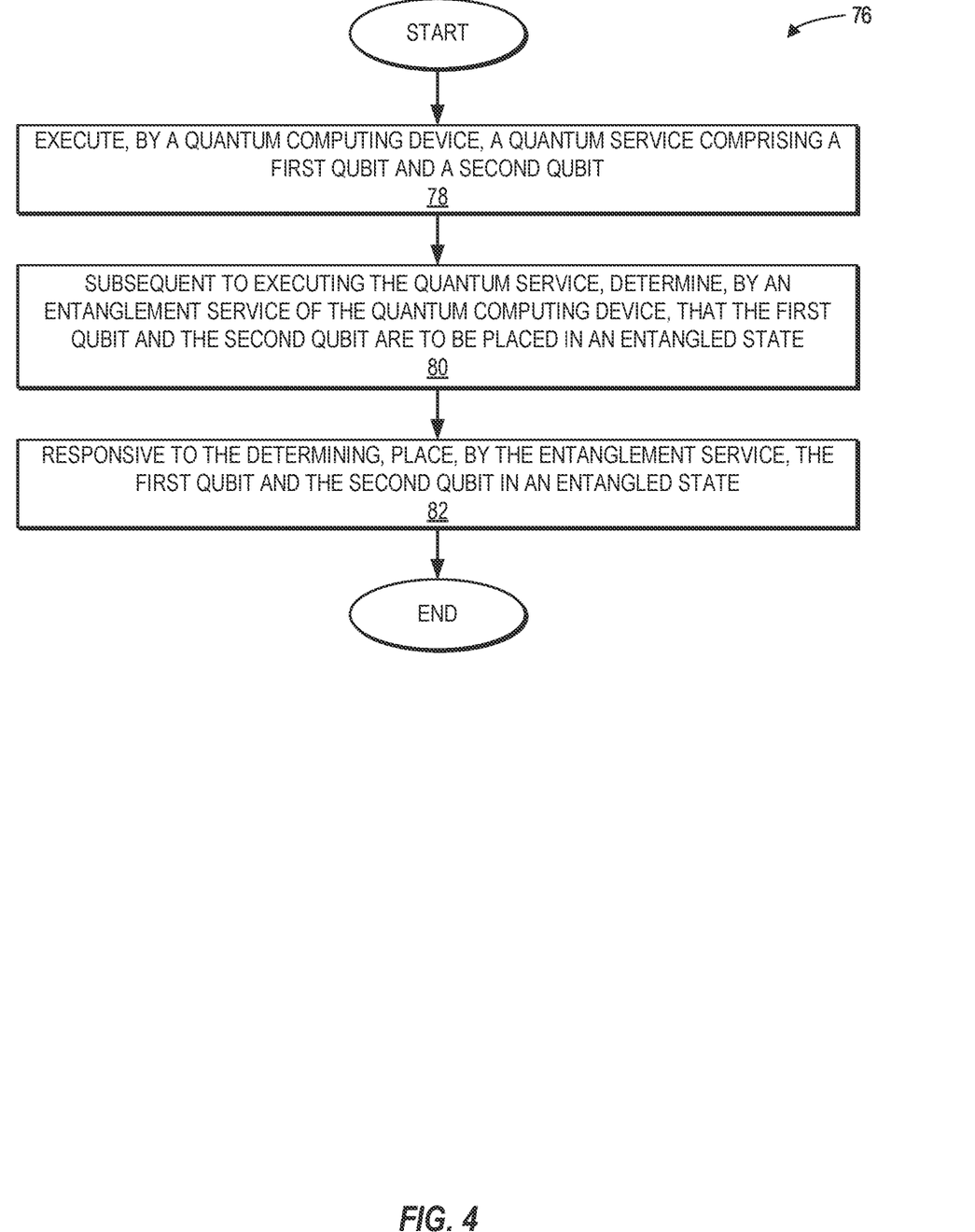
FIG. 4 is a flowchart of a simplified method for performing dynamic programmatic entanglement in quantum processing devices by the staging computing device of FIG. 3, according to one example.

FIG. 4 provides a flowchart 76 of a simplified method for performing dynamic programmatic entanglement by the quantum computing device 64 of FIG. 3, according to one example. For the sake of clarity, elements of FIG. 3 are referenced in describing FIG. 4. Operations in FIG. 4 begin with the processor device 68 of the quantum computing device 64 executing the quantum service 72 comprising the first qubit 70(0) and the second qubit 70(1) (block 78). Subsequent to executing the quantum service 72, the processor device 68 determines, using the entanglement service 74 of the quantum computing device 64, that the first qubit 70(0) and the second qubit 70(1) are to be placed in an entangled state (block 80). Responsive to the determining, the entanglement service 74 places the first qubit 70(0) and the second qubit 70(1) in an entangled state (block 82).

Figure 5:
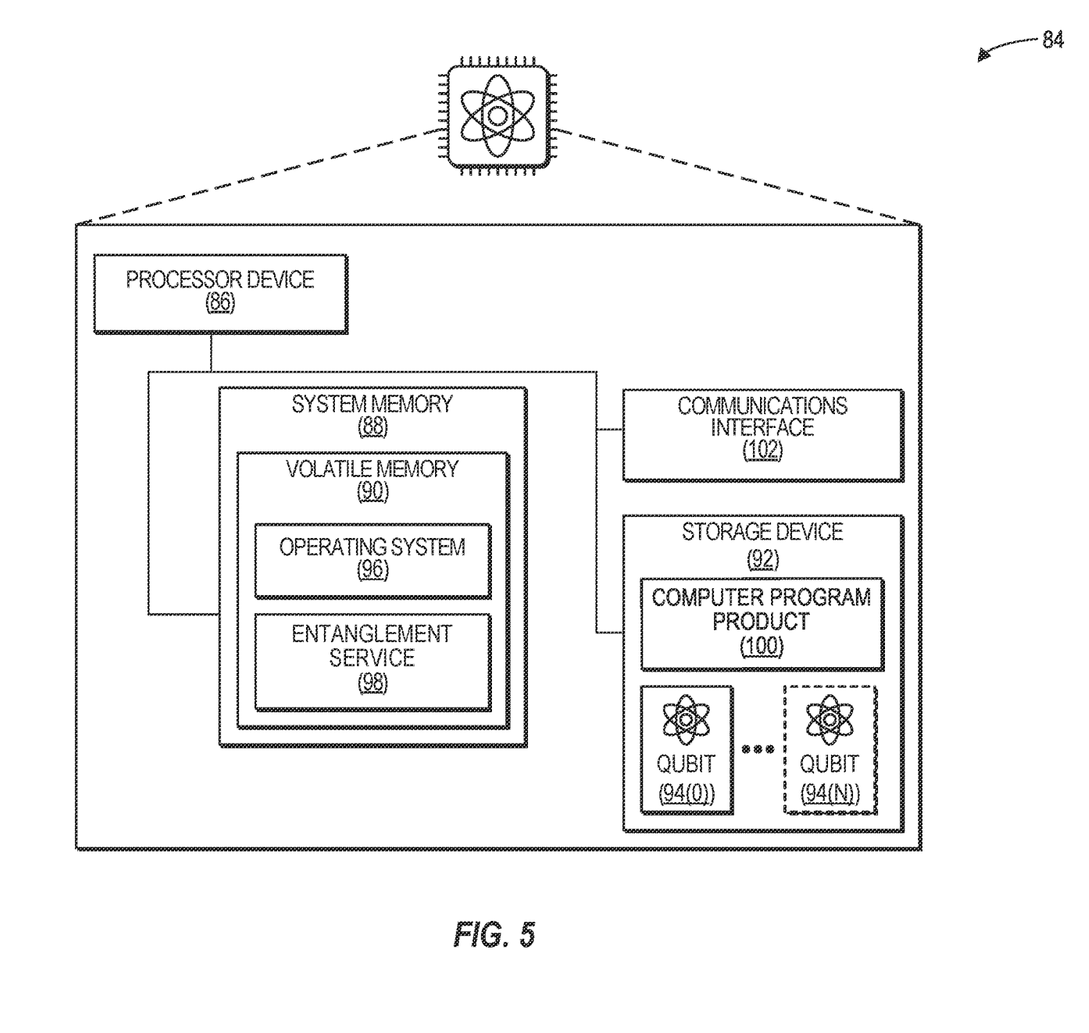
FIG. 5 is a block diagram of a quantum computing device suitable for implementing examples, according to one example.

FIG. 5 is a block diagram of a quantum computing device 84, such as the quantum computing device 10 of FIG. 1, suitable for implementing examples according to one example. The quantum computing device 84 may comprise any suitable quantum computing device or devices. The quantum computing device 84 can operate using classical computing principles or quantum computing principles. When using quantum computing principles, the quantum computing device 84 performs computations that utilize quantum-mechanical phenomena, such as superposition and entanglement. The quantum computing device 84 may operate under certain environmental conditions, such as at or near zero degrees (0°) Kelvin. When using classical computing principles, the quantum computing device 84 utilizes binary digits that have a value of either zero (0) or one (1).

The quantum computing device 84 includes a processor device 86 and a system memory 88. The processor device 86 can be any commercially available or proprietary processor suitable for operating in a quantum environment. The system memory 88 may include volatile memory 90 (e.g., random-access memory (RAM)). The quantum computing device 84 may further include or be coupled to a non-transitory computer-readable medium such as a storage device 92. The storage device 92 and other drives associated with computer-readable media and computer-usable media may provide non-volatile storage of data, data structures, computer-executable instructions, and the like. The storage device may also provide functionality for storing one or more qubits 94(0)-94(N).

A number of modules can be stored in the storage device 92 and in the volatile memory 90, including an operating system 96 and one or more modules, such as an entanglement service 98. All or a portion of the examples may be implemented as a computer program product 100 stored on a transitory or non-transitory computer-usable or computer-readable medium, such as the storage device 92, which includes complex programming instructions, such as complex computer-readable program code, to cause the processor device 86 to carry out the steps described herein. Thus, the computer-readable program code can comprise computer-executable instructions for implementing the functionality of the examples described herein when executed on the processor device 86.

An operator may also be able to enter one or more configuration commands through a keyboard (not illustrated), a pointing device such as a mouse (not illustrated), or a touch-sensitive surface such as a display device (not illustrated). The quantum computing device 84 may also include a communications interface 102 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:
   executing, by a quantum computing device, a first quantum service comprising a first qubit and a second qubit;
   subsequent to executing the first quantum service, determining, by an entanglement service of the quantum computing device that is separate from the first quantum service, that the first qubit and the second qubit are to be placed in an entangled state; and
   responsive to the determining, placing, by the entanglement service, the first qubit and the second qubit in an entangled state.

2. The method of claim 1, wherein:
   determining that the first qubit and the second qubit are to be placed in an entangled state comprises receiving a request to entangle the first qubit and the second qubit; and
   the request comprises an identifier of the first quantum service, an identifier of the first qubit, and an identifier of the second qubit.

3. The method of claim 1, wherein determining that the first qubit and the second qubit are to be placed in an entangled state comprises detecting decoherence of an entangled state between the first qubit and the second qubit.

4. The method of claim 3, wherein detecting the decoherence of the entangled state between the first qubit and the second qubit comprises detecting a change in one or more of a rate of readout errors, a rate of gate errors, longitudinal relaxation (T1) times, and transverse (T2) relaxation times for the first qubit and the second qubit.

5. The method of claim 1, wherein placing the first qubit and the second qubit in an entangled state comprises:
   applying a Hadamard gate to the first qubit; and
   applying a Controlled NOT (CNOT) gate to the second qubit.

6. The method of claim 1, further comprising receiving, from a second service, a request for notification of a change in the entangled state for the first qubit and the second qubit.

7. The method of claim 6, further comprising notifying the second service that the first qubit and the second qubit are in an entangled state.

8. The method of claim 6, further comprising:
   detecting decoherence of an entangled state between the first qubit and the second qubit; and
   notifying the second service that the first qubit and the second qubit are not in an entangled state.

9. The method of claim 1, wherein the entanglement service executes in parallel with the quantum service.

10. A quantum computing device, comprising:
    a system memory; and
    a processor device communicatively coupled to the system memory, the processor device to:
    execute a first quantum service comprising a first qubit and a second qubit;
    subsequent to executing the first quantum service, determine, using an entanglement service that is separate from the first quantum service, that the first qubit and the second qubit are to be placed in an entangled state; and
    responsive to the determining, place the first qubit and the second qubit in an entangled state using the entanglement service.

11. The quantum computing device of claim 10, wherein:
    to determine that the first qubit and the second qubit are to be placed in an entangled state is to receive a request to entangle the first qubit and the second qubit; and
    the request comprises an identifier of the first quantum service, an identifier of the first qubit, and an identifier of the second qubit.

12. The quantum computing device of claim 10, wherein to determine that the first qubit and the second qubit are to be placed in an entangled state is to detect decoherence of an entangled state between the first qubit and the second qubit.

13. The quantum computing device of claim 12, wherein to detect the decoherence of the entangled state between the first qubit and the second qubit is to detect a change in one or more of a rate of readout errors, a rate of gate errors, longitudinal relaxation (T1) times, and transverse (T2) relaxation times for the first qubit and the second qubit.

14. The quantum computing device of claim 10, wherein to place the first qubit and the second qubit in an entangled state is to:
    apply Hadamard gate to the first qubit; and
    apply Controlled NOT (CNOT) gate to the second qubit.

15. The quantum computing device of claim 10, wherein the processor device is further to receive, from a second service, a request for notification of a change in the entangled state for the first qubit and the second qubit.

16. The quantum computing device of claim 15, wherein the processor device is further to notify the second service that the first qubit and the second qubit are in an entangled state.

17. The quantum computing device of claim 15, wherein the processor device is further to:
    detect decoherence of an entangled state between the first qubit and the second qubit; and
    notify the second service that the first qubit and the second qubit are not in an entangled state.

18. A non-transitory computer-readable medium having stored thereon computer-executable instructions that, when executed, cause one or more processor devices to:
    execute a first quantum service comprising a first qubit and a second qubit;
    subsequent to executing the first quantum service, determine, using an entanglement service that is separate from the first quantum service, that the first qubit and the second qubit are to be placed in an entangled state; and
    responsive to the determining, place the first qubit and the second qubit in an entangled state.

19. The non-transitory computer-readable medium of claim 18, wherein:
    to determine that the first qubit and the second qubit are to be placed in an entangled state is to receive a request to entangle the first qubit and the second qubit; and
    the request comprises an identifier of the first quantum service, an identifier of the first qubit, and an identifier of the second qubit.

20. The non-transitory computer-readable medium of claim 18, wherein to determine that the first qubit and the second qubit are to be placed in an entangled state is to detect decoherence of an entangled state between the first qubit and the second qubit.

* * * * *